US012677860B2

(12) United States Patent
Chen

(10) Patent No.: US 12,677,860 B2
(45) Date of Patent: *Jul. 14, 2026

(54) MARBLED FOODSTUFF MANUFACTURING SYSTEM

(71) Applicant: Kellanova, Battle Creek, MI (US)

(72) Inventor: Xingjun James Chen, Richland, MI (US)

(73) Assignee: KELLANOVA, Battle Creek, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,498

(22) Filed: Jun. 11, 2024

(65) Prior Publication Data

US 2024/0324650 A1     Oct. 3, 2024

Related U.S. Application Data

(63) Continuation of application No. 17/055,191, filed as application No. PCT/US2019/032223 on May 14, 2019, now Pat. No. 12,029,233.

(Continued)

(51) Int. Cl.
*A23P 30/20*        (2016.01)
*A23J 3/22*         (2006.01)
(Continued)

(52) U.S. Cl.
CPC .............. *A23P 30/20* (2016.08); *A23J 3/227* (2013.01); *A23J 3/26* (2013.01); *A23P 30/25* (2016.08)

(58) Field of Classification Search
CPC .............. A23J 3/26; A23J 3/227; A23P 30/25
See application file for complete search history.

(56) References Cited

U.S. PATENT DOCUMENTS 3,558,324 A     1/1971  Page et al.
4,029,823 A     6/1977  Bone et al.
(Continued)

FOREIGN PATENT DOCUMENTS

WO        199917621      4/1999
WO        2017174518     10/2017

OTHER PUBLICATIONS

PCT/US2019/032223 International Search Report dated Sep. 8, 2019.

*Primary Examiner* — John J Norton
(74) *Attorney, Agent, or Firm* — Honigman LLP

(57)        ABSTRACT

A method for forming a marbled foodstuff ($F_M$) product includes the steps of extruding a first foodstuff (F1) into a foodstuff conduit (26, 36) and injecting a second foodstuff (F2) into the first foodstuff (F1) within the foodstuff conduit (26, 36). The first foodstuff (F1) includes water, red dye #3, natural smoke flavor, bacon flavor, soy isolate, wheat gluten, native tapioca starch, wheat protein texturizer, and mega-cell-80 texturizer, in combination with other elements. The second foodstuff (F2) includes water, starch, egg whites, soy protein isolate, bacon flavor paste and bacon type flavor, and soy oil, in combination with other elements. The first foodstuff (F1) and the second foodstuff (F2) provided a non-homogenous, marbled appearance when the second foodstuff is injected into the first foodstuff to provide a vegetarian foodstuff having the appearance and flavor of natural bacon.

12 Claims, 2 Drawing Sheets

Related U.S. Application Data

(60) Provisional application No. 62/671,659, filed on May 15, 2018.

(51) Int. Cl.
 *A23J 3/26* (2006.01)
 *A23P 30/25* (2016.01)

(56) References Cited

U.S. PATENT DOCUMENTS

| | | | | |
|---|---|---|---|---|
| 4,200,959 | A | * | 5/1980 | Cheney ................... A23P 30/25 |
| | | | | 426/279 |
| 4,270,486 | A | | 6/1981 | Leverenz |
| 4,358,468 | A | | 11/1982 | Dolan et al. |
| 4,372,734 | A | | 2/1983 | Dolan et al. |
| 4,524,081 | A | * | 6/1985 | Bansal ................... A23K 40/20 |
| | | | | 426/805 |
| 4,542,686 | A | | 9/1985 | Bansal |
| 4,921,414 | A | * | 5/1990 | Schliehe ............... B29C 48/362 |
| | | | | 425/197 |
| 12,029,233 | B2 | * | 7/2024 | Chen ......................... A23J 3/26 |
| 2004/0018286 | A1 | | 1/2004 | Keller et al. |
| 2008/0254199 | A1 | | 10/2008 | Orcutt et al. |
| 2017/0354165 | A1 | | 12/2017 | Palmer et al. |
| 2018/0064137 | A1 | | 3/2018 | Trottet et al. |
| 2019/0150476 | A1 | | 5/2019 | Kurnia et al. |

* cited by examiner

MARBLED FOODSTUFF MANUFACTURING SYSTEM

CROSS-REFERENCE TO RELATED APPLICATIONS

This application is a continuation application of U.S. patent application Ser. No. 17/055,191, filed Nov. 13, 2020, which is a National Stage Application and claims priority under 35 U.S.C. § 371 to Patent Cooperation Treaty application PCT/US2019/032223, filed May 14, 2019, which claims the benefit of and priority under 35 U.S.C. § 119(e) to U.S. Provisional Application Ser. No. 62/671,659, filed May 15, 2018. Priority is claimed to both of these applications and the disclosures of these prior applications are considered part of the disclosure of this application, and to the extent allowed, the entire contents of the aforementioned applications are incorporated herein.

TECHNICAL FIELD

This disclosure relates to a method and system for producing food products, and more particularly, to a method and system of producing textured food products having a non-homogenous composition.

BACKGROUND

Food products and food product manufacturing systems are known. While existing food products and food product manufacturing systems and methods perform adequately for their intended purpose, improvements to food products and food product manufacturing systems and methods are continuously being sought in order to advance the arts.

SUMMARY

This section provides a general summary of the disclosure, and is not a comprehensive disclosure of its full scope or all of its features.

One aspect of the invention foodstuff manufacturing system comprises a foodstuff extruder that forms a marbled foodstuff product including an extrudable foodstuff of a first color and an injectable foodstuff of a second color that is different from the first color. The foodstuff extruder includes a first foodstuff extruder portion having a first extrudable foodstuff conduit that is in fluid communication with an extrudable foodstuff hopper including the extrudable foodstuff. The foodstuff extruder further includes a second foodstuff extruder portion that is connected to the first foodstuff extruder portion, wherein the second foodstuff extruder portion includes a second extrudable foodstuff conduit that is in fluid communication with the first extrudable foodstuff conduit for receiving the extrudable foodstuff. The second foodstuff extruder portion includes a foodstuff injector portion with an injectable foodstuff conduit that connects an injectable foodstuff hopper in fluid communication with the second extrudable foodstuff conduit, wherein the injectable foodstuff hopper includes the injectable foodstuff. The foodstuff extruder further includes a foodstuff temperature conditioning device connected to the foodstuff extruder. The foodstuff temperature conditioning device includes a foodstuff temperature controller, a first temperature controlling device communicatively coupled to the foodstuff temperature controller, and a second temperature controlling device communicatively coupled to the foodstuff temperature controller. The first temperature controlling device is connected to the first foodstuff extruder portion, wherein the second temperature controlling device is connected to the second foodstuff extruder portion.

Implementations of the disclosure may include one or more of the following optional features. In some implementations, the marbled foodstuff product is a vegetarian marbled meat. Here, the first color defined by the extrudable foodstuff includes a substantially red food coloring, wherein the second color defined by the injectable foodstuff includes a substantially white food coloring.

In some examples the first temperature controlling device maintains the extrudable foodstuff at a first temperature when the extrudable foodstuff is within the first foodstuff extruder portion, wherein the second temperature controlling device maintains a combination of the extrudable foodstuff and the injectable foodstuff at a second temperature that is less than the first temperature when one or more of the injectable foodstuff and a combination of the extrudable foodstuff and the injectable foodstuff is within the second foodstuff extruder portion. Here, the first temperature may range from 240° F. to 250° F. In some examples, the second temperature ranges from 205° F. to 240° F. In some examples, the second temperature may range from 205° F. to 250° F.

In some implementations, an extrudable foodstuff die is connected to, located at or positioned proximate an output end of the first foodstuff extruder portion, wherein the extrudable foodstuff die is located downstream of and is in fluid communication with the first extrudable foodstuff conduit defined by the first foodstuff extruder portion. Here, the second foodstuff extruder portion is an extrudable foodstuff die extender having a body that defines the second extrudable foodstuff conduit, wherein the second extrudable foodstuff conduit is in fluid communication with the extrudable foodstuff die of the first foodstuff extruder portion. In some examples, the second extrudable foodstuff conduit is defined by a first dimension, wherein the foodstuff injector portion defines a downstream opening in fluid communication with the second extrudable foodstuff conduit, wherein the downstream opening is defined by a second dimension that is less than the first dimension. Here, the downstream opening may be an elongate opening defined in an injectable foodstuff conduit. In some implementations the foodstuff injector portion includes a pump that injects the injectable foodstuff into the second extrudable foodstuff conduit with turbulence for forming the marbled foodstuff product with a marbled appearance whereby the first color defined by the extrudable foodstuff includes a substantially red coloring, wherein the second color defined by the injectable foodstuff includes a substantially white coloring.

In some examples, the second extrudable foodstuff conduit is free of static and dynamic mixing elements.

In some configurations, the foodstuff extruder includes a post-extrusion-and-injection portion including a foodstuff conveyor positioned near a downstream opening of the second foodstuff extruder portion for receiving the marbled foodstuff product, and a foodstuff cutter for cutting the marbled foodstuff product received by the foodstuff conveyor into a plurality of foodstuff units The marbled foodstuff product is defined by a marbled appearance whereby the first color defined by the extrudable foodstuff includes a substantially red coloring, wherein the second color defined by the injectable foodstuff includes a substantially white coloring, wherein the plurality of foodstuff units define strips of vegetarian bacon.

In some examples, the post-extrusion-and-injection portion further includes a depositable foodstuff hopper that contains a depositable foodstuff, wherein the depositable foodstuff includes seasoning.

Another aspect of the disclosure includes a method for forming a foodstuff comprising the steps of extruding a first foodstuff into a foodstuff conduit. Here, the first foodstuff includes water, caramel color, red dye #3, orange liquid color, propylene glycol, glycerine, natural smoke flavor, MM bacon flavor and soy oil. The method further includes injecting a second foodstuff into the first foodstuff within the foodstuff conduit, the second foodstuff composition including water, monocalcium phosphate, egg white solids, bacon flavor paste, natural meat type enhancer flavor, bacon flavor, vegetable gum, and soy oil. The method further includes mixing the first foodstuff and the second foodstuff to form a non-homogenous, marbled foodstuff product.

In some examples, the step of mixing first foodstuff and the second foodstuff includes maintaining marbled foodstuff products at a temperature ranging from 210° F. to 250° F. within the foodstuff conduit.

Optionally, the step of extruding the second foodstuff includes providing the second foodstuff having a concentration of salt of 18.9% by weight, a concentration of egg white solids of 1% by weight, a concentration of bacon type flavor of 1.39% by weight, and a concentration of bacon flavor paste of 1.74% by weight. The method may include the step of depositing a third foodstuff onto the marbled foodstuff product.

In another aspect of the disclosure, an extruded foodstuff includes a first foodstuff, a second foodstuff, and a third foodstuff. The first foodstuff includes water, caramel color, red dye #3, orange liquid color, propylene glycol, glycerine, natural smoke flavor, MM bacon flavor and soy oil. The second foodstuff includes water, monocalcium phosphate, egg white solids, bacon flavor paste, natural meat type enhancer flavor, bacon flavor, vegetable gum, and soy oil, the second foodstuff and the second foodstuff combined to form a non-homogenous and marbled composition. The third foodstuff is deposited on a surface of the extruded foodstuff and includes soy isolate, vital wheat gluten, and tapioca starch.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Figure 1:
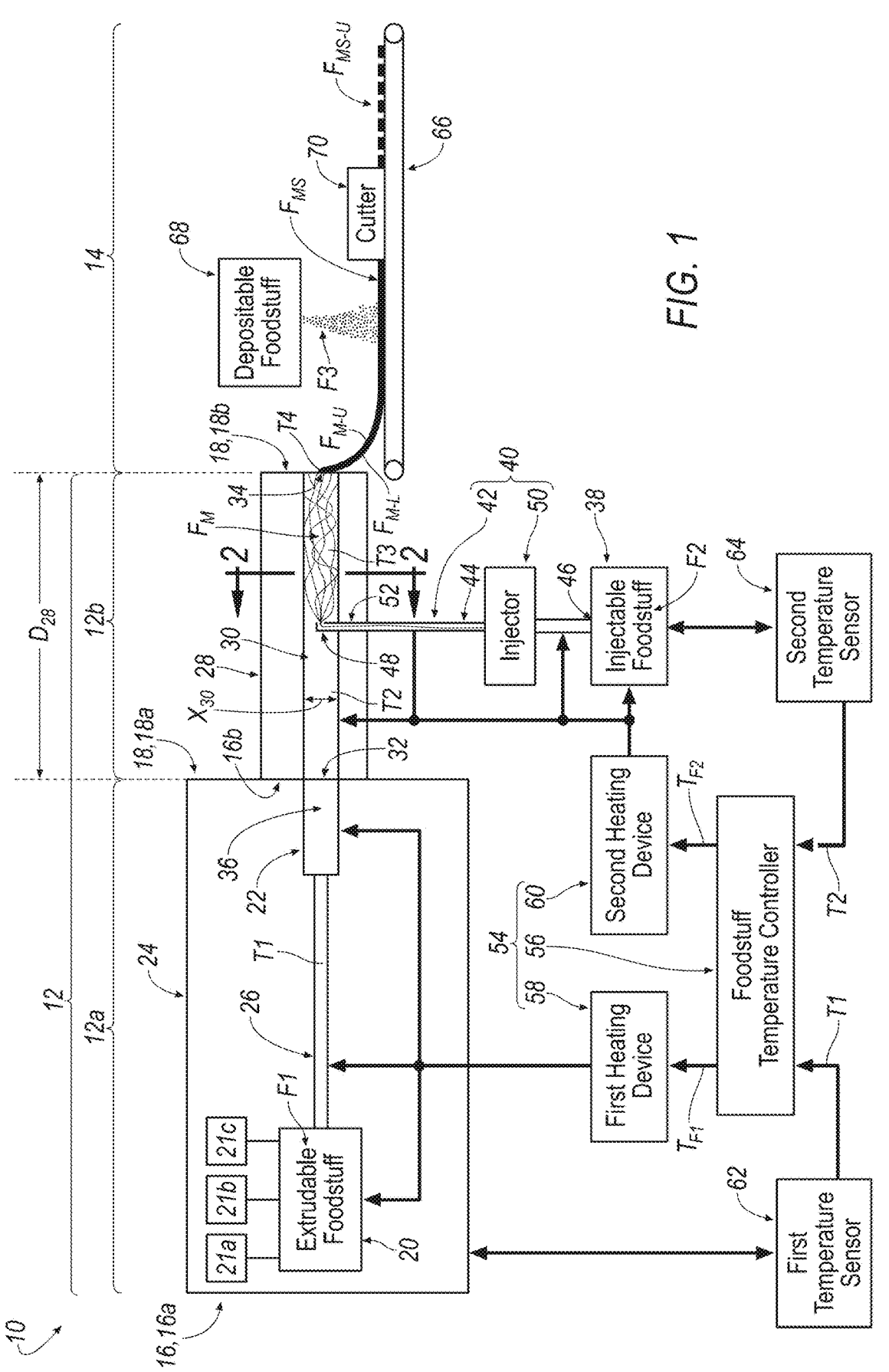
FIG. 1 is a view of an exemplary foodstuff manufacturing system.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/ or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

Referring to FIG. 1, a foodstuff manufacturing system is shown generally at 10. The foodstuff manufacturing system 10 generally includes a foodstuff extruder 12 including a first foodstuff extruder portion 12a and a second foodstuff extruder portion 12b. The first foodstuff extruder portion 12a is connected (for instance, mechanically connected) to the second foodstuff extruder portion 12b. Furthermore, the first foodstuff extruder portion 12a is fluidly-connected to the second foodstuff extruder portion 12b.

The first foodstuff extruder portion 12a generally defines or includes an input end 16 of the foodstuff extruder 12. The second foodstuff extruder portion 12b generally defines or includes an output end 18 of the foodstuff extruder 12.

The first foodstuff extruder portion 12a generally defines or includes an input end 16a and an output end 18a. The second foodstuff extruder portion 12b generally defines or has an input end 16b and an output end 18b.

The input end 16a of the first foodstuff extruder portion 12a may generally define or include the input end 16 of the foodstuff extruder 12. The output end 18b of the second foodstuff extruder portion 12b may generally define or include the output end 18 of the foodstuff extruder 12. The output end 18a of the first foodstuff extruder portion 12a is mechanically-connected and fluidly-connected to the input end 16b of the second foodstuff extruder portion 12b. Furthermore, an extrudable foodstuff die 22 may be connected to, located at or positioned proximate the output end 18a of the first foodstuff extruder portion 12a.

An extrudable foodstuff hopper 20 configured to contain an extrudable foodstuff F1 may be connected to, located at or positioned proximate to the input end 16a of the first foodstuff extruder portion 12a. The extrudable foodstuff hopper 20 may be provided with one or more pumps 21, 21a-21c for providing a continuous supply of the foodstuff ingredients to the extrudable foodstuff hopper 20, as described in greater detail below.

The first foodstuff extruder portion 12a may be further defined by a body 24 including a first extrudable foodstuff conduit 26 that fluidly connects the extrudable foodstuff hopper 20 to the extrudable foodstuff die 22. In some examples, the first foodstuff extruder portion 12a may be a direct expansion (DX) extruder that cooks the extrudable foodstuff F1 under heat and pressure as the extrudable foodstuff F1 is advanced through first extrudable foodstuff conduit 26 from the extrudable foodstuff hopper 20 to the extrudable foodstuff die 22. The extruder may be a single screw or a twin-screw extruder, such as a hot melt-type extruder.

The second foodstuff extruder portion 12b may be further defined by a body 28 defining or including an extrudable foodstuff conduit 30. Access to the extrudable foodstuff conduit 30 is through an upstream opening 32 and a downstream opening 34. The body 28 may be referred to as an extrudable foodstuff die extender. The extrudable foodstuff die extender 28 is mechanically-connected and fluidly-connected to the extrudable foodstuff die 22 of the first foodstuff extruder portion 12a. As seen in FIG. 1, the extrudable foodstuff die extender 28 extends at a distance $D_{28}$ away from the output end 18a of the first foodstuff extruder portion 12a.

The extrudable foodstuff conduit 30 of the extrudable foodstuff die extender 28 is fluidly connected to the first extrudable foodstuff conduit 26 formed by the body 24 of the first foodstuff extruder portion 12a by way of a second extrudable foodstuff conduit 36 extending through the extrudable foodstuff die 22 of the first foodstuff extruder portion 12a. The extrudable foodstuff conduit 30 of the extrudable foodstuff die extender 28 may be defined by a dimension $X_{30}$ (e.g., a radius or a diameter) that may be substantially equal to a dimension (not shown) of the second extrudable foodstuff conduit 36 extending through the extrudable foodstuff die 22 of the first foodstuff extruder portion 12a. The conduit 30 of the second foodstuff extruder portion 12b may be free of mixing blades, static mixers, extruder screws, and the like and may be an open conduit (such as after the injectable foodstuff conduit 44 and opening/nozzle 48 thereof) with no obstructions or other mixing elements.

The second foodstuff extruder portion 12b may be further defined by an injectable foodstuff hopper 38 mechanically connected to and fluidly-connected to a foodstuff injector portion 40. The injectable foodstuff hopper 38 is configured to contain an injectable foodstuff F2. The foodstuff injector portion 40 is mechanically connected to and fluidly connected to the extrudable foodstuff die extender 28. The injectable foodstuff F2 may be an injectable dough, a plastic foodstuff material, an elastic foodstuff material or the like, as discussed in greater detail below.

Figure 2:
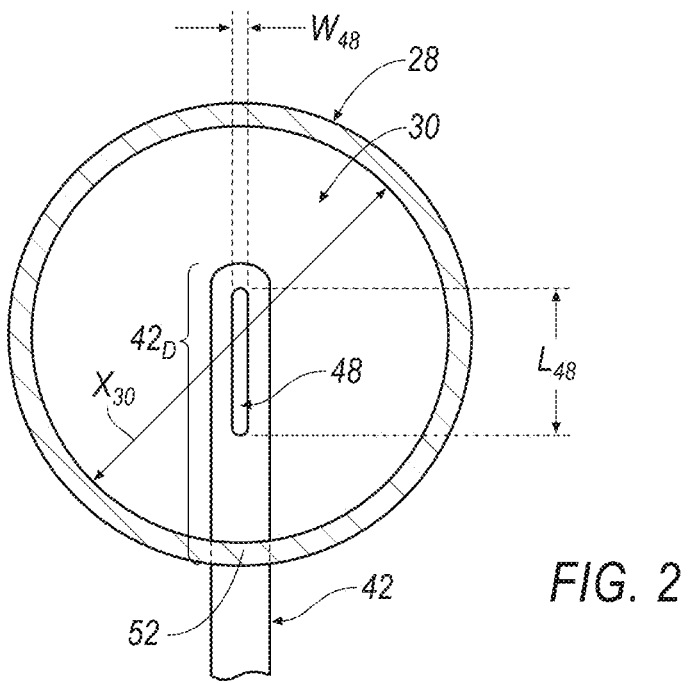
FIG. 2 is a cross-sectional view according to line 2-2 of FIG. 1.

The foodstuff injector portion 40 includes a body 42 defining or including an injectable foodstuff conduit 44. Access to the injectable foodstuff conduit 44 is through an upstream opening 46 and a downstream opening 48. The upstream opening 46 is fluidly-connected to the injectable foodstuff hopper 38. As seen in FIG. 2, the downstream opening 48 is in fluid communication with the extrudable foodstuff conduit 30 of the extrudable foodstuff die extender 28. Accordingly, the downstream opening 48 is configured to inject the injectable foodstuff F2 into a flow of the extrudable foodstuff F1 within the conduit 30. As seen in FIG. 1, a combination of the extrudable foodstuff F1 and the injectable foodstuff F2 forms a vegetarian marbled foodstuff $F_M$.

As seen in FIG. 2, a dimension (see, e.g., width $W_{48}$ and length $L_{48}$) of the downstream opening 48 formed by the body 42 of the foodstuff injector portion 40 may be proportionally smaller than a dimension (see, e.g., $X_{30}$) of the extrudable foodstuff conduit 30 of the extrudable foodstuff die extender 28. In one approach, the opening 48 may be an elongate opening, such as an obround or rectangular opening. As a result of selectively sizing the dimension $W_{48}$, $L_{48}$ of the downstream opening 48 formed by the body 42 of the foodstuff injector portion 40 to be smaller than the dimension $X_{30}$ of the extrudable foodstuff conduit 30 of the extrudable foodstuff die extender 28, the amount of the injectable foodstuff F2 defining the intramuscular white fat may be less than the amount of the extrudable foodstuff F1 defining muscle tissue in resulting a vegetarian marbled meat $F_M$ produced by the foodstuff manufacturing system 10. Further, the shape of the opening 48 provides marbling effect of the injectable foodstuff F2 within the extrudable foodstuff F1, as discussed in greater detail below.

A distance between the downstream opening 48 and the output end 18b is selected to impart desirable marbling characteristics to the marbled foodstuff $F_M$. For example, the distance $D_{28}$ may be selected to provide a suitable distance $D_{48}$ between the downstream opening 48 and the output end 18b to allow the injectable foodstuff F2 to solidify or gel within the marbled foodstuff $F_M$. Alternatively, the distance $D_{48}$ may be determined based on position of the downstream opening 48 within the conduit 30. The distance $D_{48}$ is dependent on a flow rate, pressure, and temperature of the marbled foodstuff $F_M$ within the conduit.

As seen in FIG. 1, a sidewall of the extrudable foodstuff die extender 28 includes a midstream foodstuff injection conduit 52 formed therethrough. The foodstuff injection conduit 52 is in fluid communication with the extrudable foodstuff conduit 30 extending through the extrudable foodstuff die extender 28. The midstream foodstuff injection conduit 52 is located downstream of the upstream opening 32 of the extrudable foodstuff die extender 28 and upstream of the downstream opening 34 of the extrudable foodstuff die extender 28. As seen in FIGS. 1-2, the midstream foodstuff injection conduit 52 is sized for receiving a distal portion $42_D$ of the body 42 of the foodstuff injector portion 40 such that the downstream opening 48 defined by the body 42 of the foodstuff injector portion 40 is arranged within the extrudable foodstuff conduit 30 extending through the extrudable foodstuff die extender 28 for placing the injectable foodstuff conduit 44 extending through the body 42 in fluid communication with the extrudable foodstuff conduit 30 extending through the extrudable foodstuff die extender 28.

The foodstuff injector portion 40 may further include a pump 50. The pump 50 may be in fluid communication with the injectable foodstuff conduit 44 of the body 42 for injecting or directing the injectable foodstuff F2 in a downstream direction from the injectable foodstuff hopper 38 to the downstream opening 48 formed by the body 42.

Referring to FIG. 1, in some implementations, the foodstuff manufacturing system 10 may further include a foodstuff temperature conditioning device 54. The foodstuff temperature device 54 may include a foodstuff temperature controller 56, a first heating device 58 and a second heating device 60. The foodstuff temperature controller 56 is communicatively coupled to the first heating device 58. The foodstuff temperature controller 56 is communicatively coupled to the second heating device 58.

The first heating device 58 may be mechanically-connected to, fluidly-connected to and/or positioned proximate one or more of the first foodstuff extruder portion 12a. The second heating device 60 may be mechanically connected to, fluidly connected to and/or positioned proximate one or more of the second foodstuff extruder portion 12b.

Although the devices 58, 60 are referred to as 'heating' devices, the devices 58, 60 are not necessarily limited to devices that impart heat, alone, to the first foodstuff extruder portion 12a and the second foodstuff extruder portion 12b. For example, the devices 58, 60 may alternatively cool the first foodstuff extruder portion 12a and the second foodstuff extruder portion 12b. In yet another example, the devices 58, 60 may alternatively provide two functions by heating or cooling the first foodstuff extruder portion 12a and the second foodstuff extruder portion 12b. Accordingly, as seen in FIG. 1, each of the first foodstuff extruder portion 12a and the second foodstuff extruder portion 12b may respectively include a first temperature sensor 62 and a second temperature sensor 64 that provides a sensed temperature feedback signal T1, T2 to the temperature controller 56. The temperature controller 56 may be configured for controlling the devices 58, 60, thereby potentially maintaining or modifying one or both of the a first temperature control signal $T_{F1}$ and the a second temperature control signal $T_{F2}$ for maintaining, increasing or decreasing the desired temperature of the extrudable foodstuff F1, the injectable foodstuff F2 and/or a combination of the extrudable foodstuff F1 and the injectable foodstuff F2 as the extrudable foodstuff F1, the injectable foodstuff F2 and/or a combination of the extrudable foodstuff F1 and the injectable foodstuff F2 passes through the foodstuff extruder 12.

The system 10 may further include a support portion such as, for example, a foodstuff conveyor 66, which may be a component of a post-extrusion-and-injection portion 14 of the foodstuff manufacturing system 10. The post-extrusion-and-injection portion 14 may further include an optional depositable foodstuff hopper 68 and a foodstuff cutter 70. The optional depositable foodstuff hopper 68 contains a depositable foodstuff F3, as described below. The foodstuff cutter 70 is arranged downstream of the optional depositable foodstuff hopper 68.

Figure 3:
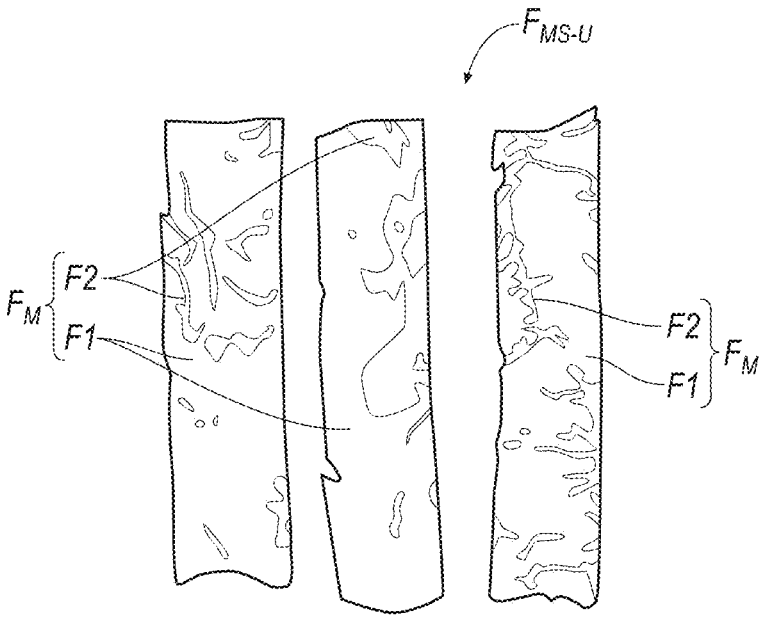
FIG. 3 is a view of exemplary food product produced by the foodstuff manufacturing system of FIG. 1.

In an example, the extrudable foodstuff F1 may be a red foodstuff or may include a red food coloring in order to give the appearance of muscle tissue that may be contrasted with, for example, another white-colored foodstuff material that may give the appearance of intramuscular fat (see, e.g., F2 in FIG. 3) that when combined may provide a vegetarian foodstuff that resembles marbled meat such as bacon (see, e.g., $F_M$ in FIG. 3). The following is a representative example of formulations of the extrudable foodstuff F1, including formulations for a red liquid RL and a nutritional powder NP.

| Ingredient | % Weight |
|---|---|
| Extrudable Foodstuff (F1) | |
| Red Liquid | 46.71 |
| Nutritional Powder | 31.76 |
| Soy Oil | 21.53 |
| Red Liquid (RL) | |
| Water | 81.74 |
| Caramel Color | 1.32 |
| Red #3 | 0.25 |
| Orange Liquid Color | 1.33 |
| Propylene Glycol | 0.83 |
| Glycerine | 6.28 |
| Natural Smoke Flavor | 1.36 |
| Bacon Flavor | 8.09 |
| Nutritional Powder (NP) | |
| Soy Isolate | 68.00 |
| Vital Wheat Gluten | 18.00 |
| Native Tapioca Starch | 4.00 |
| Wheat Protein Texturizer | 8.00 |
| Megacell-80 Texturizer | 2.00 |

Initially, a supply of the extrudable foodstuff F1 is provided to the extrudable foodstuff hopper 20. The extrudable foodstuff F1 may be an extrudable dough, a plastic foodstuff material, an elastic foodstuff material or the like. In some examples, the extrudable foodstuff F1 is provided to the foodstuff hopper as a prepared batch of extrudable foodstuff F1 including the ingredients above. Alternatively, two or more ingredients of the extrudable foodstuff F1 may be continuously provided to the extrudable foodstuff hopper 20 for mixing within the first foodstuff extruder portion 12a. In the illustrated example, a first pump 21a, a second pump 21b, and a third pump 21c respectively provide the red liquid, the nutritional powder, and the soy oil at flow rates proportional to the percent weight of each ingredient in the extrudable foodstuff F1, as provided above.

The extrudable foodstuff F1 is received by the first extrudable foodstuff conduit 26 from the extrudable food-stuff hopper 20, and passes along the first foodstuff extruder portion 12a. As provided above, the first foodstuff extruder portion 12a may be a direct expansion (DX) extruder that cooks the extrudable foodstuff F1 under heat and pressure as the extrudable foodstuff F1 is advanced through first extrud-able foodstuff conduit 26 from the extrudable foodstuff hopper 20 to the extrudable foodstuff die 22.

As a result of a first temperature control signal $T_{F1}$ sent from the foodstuff temperature controller 56 to the first heating device 58, the first heating device 58 heats the extrudable foodstuff F1 at a first temperature T1 when the extrudable foodstuff F1 is within the first foodstuff extruder portion 12a. The first foodstuff extruder 12a may have a plurality of temperature zones along a length thereof for progressively heating the extrudable foodstuff F1 between the extrudable foodstuff hopper 20 and the input end 16b of the second foodstuff extruder portion 12b. For example, a first zone of the first foodstuff extruder 12a may be heated to 200° F., a second zone of the first foodstuff extruder 12a may be heated to 250° F., and a third zone of the first foodstuff extruder 12b may be heated to 275-300° F. The gradual increase in temperature minimizes the breakdown of proteins within the extrudable foodstuff F1. In an example, the extrudable foodstuff F1 may be heated to a first tem-perature T1 ranging from 240° F. to 250° F., which has been discovered to provide a texture that closely correspond a texture of muscle tissue and fat of bacon. Other temperatures may be used to provide textures corresponding to other meat types.

The heated extrudable foodstuff F1 then passes from the first foodstuff extruder portion 12a to the second foodstuff extruder portion 12b, where the injectable foodstuff F2 is injected into the extrudable foodstuff F2 to provide a non-homogeneous, marbled composition.

As with the extrudable foodstuff F1, the injectable food-stuff F2 is initially provided to the injectable foodstuff hopper 38 of the system 10. In an example, the injectable foodstuff F2 may be white or may include a white food coloring in order to give the appearance of intramuscular fat that may be contrasted with, for example, another red-colored foodstuff material that may give the appearance of muscle tissue (see, e.g., F1 in FIG. 3) that collectively may provide a vegetarian foodstuff that resembles marbled meat such as bacon (see, e.g., $F_M$ in FIG. 3). The following are representative examples of formulations of the injectable foodstuff F2, including formulations for a White Master Mix and a White Minor mix, which may be included in the injectable foodstuff F2.

| Ingredient | % Weight |
|---|---|
| Injectable Foodstuff (F2) | |
| Water (70 F) | 31.38 |
| Monocalcium phosphate | 0.39 |
| White Master Mix | 18.91 |
| Egg White Solids | 1.00 |
| White Minor Mix | 1.92 |
| Bacon Flavor Paste | 1.74 |
| Natural Meat Type Enhancer Flavor | 1.00 |
| Bacon Type Flavor | 1.39 |
| Vegetable Gum | 0.08 |

-continued

| Ingredient | % Weight |
|---|---|
| Soy Oil | 42.20 |
| White Master Mix | |
| Starch | 66.00 |
| Soy Protein Isolate | 10.80 |
| Egg Whites | 10.00 |
| Salt | 8.00 |
| Sodium Citrate | 5.00 |
| Nucleotide | 0.10 |
| Vitamins | 0.10 |
| White Minor Mix | |
| Hydrolyzed Vegetable Protein LXR100 | 62.30 |
| Sugar | 13.70 |
| Malic Acid | 13.60 |
| Hydrolyzed Vegetable Protein E40V | 10.4 |

The injectable foodstuff F2 is injected into the conduit 30 of the second foodstuff extruder portion 12b via the down-stream opening 48, where the injectable foodstuff F2 exits the body 42 of the foodstuff injector portion 40 and arrives within the extrudable foodstuff conduit 30 of the extrudable foodstuff die extender 28. A pressure or volumetric flow rate at which the injectable foodstuff F2 is provided to the conduit 30 is controlled to provide desirable marbling. For example, the pump 50 injects or directs the injectable foodstuff F2 into the extrudable foodstuff conduit 30 of the extrudable foodstuff die extender 28 in a non-uniform man-ner (i.e., not as a continuous strip) with turbulence. Because the injectable foodstuff F2 is injected or directed into the extrudable foodstuff conduit 30 of the extrudable foodstuff die extender 28 with turbulence, the injectable foodstuff F2 is blended or marbled with the extrudable foodstuff F1 in a non-uniform manner in order to give the appearance of muscle tissue (F1) with intramuscular white fat F2. As described above and seen at FIG. 3, an example of the resulting food product produced by the foodstuff manufac-turing system 10 is a vegetarian marbled foodstuff $F_M$.

Similar to the extrudable foodstuff F1, a temperature of the injectable foodstuff F2 or may be controlled to provide desired texturing and appearance. For example, as a result of a second temperature control signal $T_{F2}$ sent from the foodstuff temperature controller 56 to the second heating device 60, the second heating device 60 maintains one or more of the injectable foodstuff F2 and a combination of the extrudable foodstuff F1 and the injectable foodstuff F2 at a second temperature T2 that is less than the first temperature T1 when one or both of the extrudable foodstuff F1 and the injectable foodstuff F2 are arranged within the second foodstuff extruder portion 12b. The second temperature T2 is less than the first temperature T1 for the purpose of thermally setting (i.e. gelling) the injectable foodstuff F2 within the extrudable foodstuff F1 as the injectable foodstuff F2 is blended and marbled with the extrudable foodstuff F1 within the extrudable foodstuff conduit 30 extending through the extrudable foodstuff die extender 28. In an example, the second temperature T2 is in the range from 205° F. to 250° F., and more preferably in the range of 205° F. to 240° F., and most preferably at 210° F. As the injectable foodstuff F2 is injected into the extrudable foodstuff F1, a resulting third temperature T3 of the vegetarian marbled foodstuff $F_M$ is between the first temperature T1 and the second temperature T2.

The vegetarian marbled foodstuff $F_M$ exits the second foodstuff extruder portion 12b at the downstream opening 34 defined by the extrudable foodstuff die extender 28. The downstream opening 34 may be a cooling die 34 that is maintained at a lower temperature T4 than the third temperature T3. In one example, the cooling die is maintained at a temperature of 150° F., which results in the vegetarian marbled foodstuff $F_M$ being cooled to 205° F. at the downstream opening 34.

The vegetarian marbled foodstuff $F_M$ is generally defined by an upper surface $F_{M-U}$ and a lower surface $F_{M-L}$. The lower surface $F_{M-L}$ of the vegetarian marbled foodstuff $F_M$ may be arranged upon the foodstuff conveyor 66. In an example, the optional depositable foodstuff hopper 68 may be arranged proximate the downstream opening 34 defined by the extrudable foodstuff die extender 28 such that when the vegetarian marbled foodstuff $F_M$ exits the extrudable foodstuff die extender 28, the depositable foodstuff F3 is arranged upon the upper surface $F_{M-U}$ of the vegetarian marbled foodstuff $F_M$ for defining a seasoned vegetarian marbled foodstuff $F_{MS}$. The depositable foodstuff F3 may be, for example, a fine powdery foodstuff, such as, for example a ground seasoning or the like. The following is a representative example of formulations of the depositable foodstuff F3.

| Depositable Foodstuff (F3) | |
| --- | --- |
| Ingredient | % Weight |
| Soy Isolate | 51.50 |
| Vital Wheat Gluten | 45.00 |
| Tapioca Starch | 3.50 |

As provided above, the foodstuff cutter 70 is arranged downstream of the optional depositable foodstuff hopper 68, and cuts the seasoned vegetarian marbled foodstuff $F_{MS}$ into a plurality of foodstuff units $F_{MS-U}$ (see also FIG. 3). The plurality of foodstuff units $F_{MS-U}$ may be sized to resemble a plurality of strips of vegetarian foodstuff that has an appearance similar to marbled meat, such as, for example, bacon.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A foodstuff manufacturing system, comprising:
a first extrudable foodstuff conduit in fluid communication with an extrudable foodstuff source;
a second extrudable foodstuff conduit in fluid communication with the first extrudable foodstuff conduit, wherein the second extrudable foodstuff conduit is free of static and dynamic mixing elements;
an injectable foodstuff conduit including a distal end disposed within the second extrudable foodstuff conduit;
a foodstuff temperature controller;
a first temperature controlling device communicatively coupled to the foodstuff temperature controller and to the first extrudable foodstuff conduit; and
a second temperature controlling device communicatively coupled to the foodstuff temperature controller and to the second extrudable foodstuff conduit.

2. The foodstuff manufacturing system of claim 1, wherein the extrudable foodstuff source in communication with the first extrudable foodstuff conduit includes an extrudable foodstuff; and
the injectable foodstuff source in communication with the injectable foodstuff conduit includes an injectable foodstuff.

3. The foodstuff manufacturing system of claim 2, wherein the extrudable foodstuff has a first color including a substantially red food coloring and the injectable foodstuff has a second color including a substantially white food coloring.

4. The foodstuff manufacturing system of claim 3, further comprising a pump that injects the injectable foodstuff into the second extrudable foodstuff conduit with turbulence for forming a marbled foodstuff product with a marbled appearance.

5. The foodstuff manufacturing system of claim 3, wherein the first temperature controlling device maintains the extrudable foodstuff at a first temperature when the extrudable foodstuff is within the first extrudable foodstuff conduit based on feedback from a first temperature sensor, wherein the second temperature controlling device maintains a combination of the extrudable foodstuff and the injectable foodstuff at a second temperature based on feedback from a second temperature sensor, the second temperature being less than the first temperature when the combination of the extrudable foodstuff and the injectable foodstuff is within the second extrudable foodstuff conduit.

6. The foodstuff manufacturing system of claim 5, wherein the first temperature comprises a range from 240° F. to 250° F., wherein the first extrudable foodstuff conduit comprises a plurality of temperatures zones, each temperature zone heated to one or more zone temperatures in a range from 200° F. to 300° F. based on feedback from the first temperature sensor to gradually heat the extrudable foodstuff to the first temperature.

7. The foodstuff manufacturing system of claim 6, wherein the second temperature comprises a range from 205° F. to 240° F.

8. The foodstuff manufacturing system of claim 6, wherein the second temperature comprises a range from 205° F. to 250° F.

9. The foodstuff manufacturing system of claim 1, wherein an extrudable foodstuff die is connected to, located at or positioned proximate to an output end of the first extrudable foodstuff conduit, wherein the extrudable foodstuff die is located downstream of and is in fluid communication with first extrudable foodstuff conduit.

10. The foodstuff manufacturing system of claim 9, further comprising an extrudable foodstuff die extender having a body defining the second extrudable foodstuff conduit, wherein the second extrudable foodstuff conduit is in fluid communication with the extrudable foodstuff die of the first extrudable foodstuff conduit.

11. The foodstuff manufacturing system of claim 9, wherein the second extrudable foodstuff conduit is defined by a first dimension, wherein the distal end of the injectable foodstuff conduit defines an injector opening disposed within the second extrudable foodstuff conduit, wherein the injector opening is defined by a second dimension that is less than the first dimension.

12. The foodstuff manufacturing system of claim 11, wherein the injector opening is an elongate opening formed along an axial portion of the injectable foodstuff conduit.

* * * * *